United States Patent
Lister

(10) Patent No.: US 10,124,811 B2
(45) Date of Patent: Nov. 13, 2018

(54) CVT TARGET ENGINE SPEED CONTROL WITH UNRELIABLE OUTPUT FEEDBACK

(71) Applicant: Caterpillar Inc., Peoria, IL (US)

(72) Inventor: Brian Lister, Edwards, IL (US)

(73) Assignee: Caterpillar Inc., Deerfield, IL (US)

( * ) Notice: Subject to any disclaimer, the term of this patent is extended or adjusted under 35 U.S.C. 154(b) by 197 days.

(21) Appl. No.: 15/349,776

(22) Filed: Nov. 11, 2016

(65) Prior Publication Data

US 2018/0134303 A1 May 17, 2018

(51) Int. Cl.
| | |
|---|---|
| B60W 10/06 | (2006.01) |
| B60W 10/101 | (2012.01) |
| B60W 50/02 | (2012.01) |
| B60W 30/188 | (2012.01) |

(52) U.S. Cl.
CPC ........ *B60W 50/0205* (2013.01); *B60W 10/06* (2013.01); *B60W 10/101* (2013.01); *B60W 30/188* (2013.01); *B60W 2050/0215* (2013.01); *B60W 2300/17* (2013.01); *B60W 2510/0638* (2013.01); *B60W 2510/104* (2013.01); *B60W 2510/1015* (2013.01); *B60W 2540/10* (2013.01); *B60W 2540/12* (2013.01); *B60W 2710/0644* (2013.01); *B60W 2710/1005* (2013.01)

(58) Field of Classification Search
CPC .. B60W 10/06; B60W 10/101; B60W 30/188; B60W 50/0205; B60W 2050/0215; B60W 2710/0644; B60W 2710/1005
See application file for complete search history.

(56) References Cited

U.S. PATENT DOCUMENTS

| | | | |
|---|---|---|---|
| 4,961,315 A | 10/1990 | Ishikawa et al. | |
| 4,967,610 A | 11/1990 | Sasajima et al. | |
| 5,040,114 A | 8/1991 | Ishikawa et al. | |
| 5,101,689 A | 4/1992 | Yamaguchi et al. | |
| 5,435,795 A | 7/1995 | Mochizuki et al. | |
| 5,622,050 A | 4/1997 | Ishino et al. | |
| 8,216,109 B2 * | 7/2012 | Dahl | F16H 61/472 477/37 |
| 8,447,480 B2 | 5/2013 | Usukura | |
| 2006/0014608 A1 | 1/2006 | Mitchell et al. | |
| 2007/0142167 A1 * | 6/2007 | Kanafani | B60W 10/06 477/37 |
| 2013/0297141 A1 * | 11/2013 | Yun | G06F 17/00 701/29.1 |

* cited by examiner

*Primary Examiner* — Edwin A Young
(74) *Attorney, Agent, or Firm* — Miller, Matthias & Hull

(57) ABSTRACT

A machine may include an engine, a traction device, a continuously variable transmission (CVT) connecting the engine to the traction device, an operator input device outputting engine output command signals input by an operator, an engine speed sensor monitoring an engine output speed, and an electronic control module (ECM). The ECM controls a machine output of the machine by executing a transmission output control routine using transmission output parameters as feedback when transmission output parameter sensor signals are reliable. The ECM controls the machine output by executing a target engine speed control routine using an engine output speed sensor signals as feedback when the transmission output parameter sensor signals are nor reliable. In the target engine speed control routine, the ECM determines a CVT transmission ratio that will cause the CVT to apply a load to the engine that will cause the engine to run at the target engine speed.

20 Claims, 4 Drawing Sheets

CVT TARGET ENGINE SPEED CONTROL WITH UNRELIABLE OUTPUT FEEDBACK

TECHNICAL FIELD

The present invention relates generally to speed control in vehicles and machines, and more particularly, to controlling an engine speed and a transmission ratio in a vehicle or machine having a continuously variable transmission by comparing an actual engine speed to a target engine speed when machine brakes are applied, transmission output sensors fail or other conditions exist making transmission control based on transmission output conditions unreliable.

BACKGROUND

Transmission systems may be used to couple the output of a prime mover or power source, for example, an internal combustion engine, to a driven element or device such as wheels or a work implement on a work machine. Transmissions are typically part of a power train that transmits power that may be in the form of torque and/or rotational speed from the power source to the driven element. A continuously variable transmission (CVT) provides an infinite or continuous range of torque-to-speed output ratios with respect to any given input from the power source. In other words, the output of the CVT can be increased or decreased across a continuous range in infinitesimally small increments.

U.S. Pat. No. 8,216,109 issued on Jul. 10, 2012, to Dahl et al. entitled "Torque-Based Control System for a Continuously Variable Transmission" discloses a method of managing the operation of a machine having an operator station with one or more operator interface devices, one or more traction devices and a power train operatively connected to drive at least one of the traction devices. The operator interface devices may include devices for initiating movement of the machine by transmitting signals to a control module. The power train includes a power source, such as an engine, and a transmission unit connected to receive the power output from the power source and transmit the power output to the traction devices. The control module regulates the operation of the transmission unit in response to one or more inputs from the operator interface devices. A first sensor associated with the power source senses an output speed thereof, and a second sensor associated with the transmission unit and/or the traction device senses a travel speed of the machine. The transmission unit may embody a continuously variable transmission. The control module uses information provided by the sensors to control an output torque of the transmission unit that is determined in response to multiple inputs by an operator at the operator interface devices.

SUMMARY OF THE DISCLOSURE

In one aspect of the present disclosure, a machine for operating at a work site and traveling over a work surface of the work site is disclosed. The machine may include an engine, a traction device, a continuously variable transmission (CVT) operatively connected between the engine and the traction device to transfer power output by the engine to the traction device, operator input devices in an operator station of the machine for detecting engine output commands and brake force commands that are input by an operator of the machine and outputting engine output command signals corresponding to the engine output commands and brake force command signals corresponding to the brake force commands input by the operator at the operator input devices, a transmission output parameter sensor automatically monitoring a transmission output parameter of the CVT and outputting transmission output parameter sensor signals corresponding to the transmission output parameter of the CVT, an engine speed sensor automatically monitoring an engine output speed of the engine and outputting engine speed sensor signals corresponding to the engine output speed of the engine, and an electronic control module (ECM) operatively connected to the engine, the CVT, the operator input devices, the engine speed sensor and the transmission output parameter sensor. The ECM is programmed to receive the engine output command signals and the brake force command signals from the operator input devices, and execute a transmission output control routine based on the engine output command signals and the transmission output parameter sensor signals to control a machine output of the machine in response to determining that the transmission output parameter sensor signals from the transmission output parameter sensor are a reliable indicator of transmission output conditions. In response to determining that the transmission output parameter sensor signals from the transmission output parameter sensor are not the reliable indicator of the transmission output conditions, the ECM is further programmed to determine a transmission control target engine speed based on the engine output command signals, determine a transmission ratio for the CVT based on the transmission control target engine speed to cause the engine to operate at the transmission control target engine speed, and transmit transmission command signals to the CVT to control the CVT so that a transmission output speed divided by a transmission input speed is equal to the transmission ratio determined based on the transmission control target engine speed.

In another aspect of the present disclosure, a method for controlling an engine output speed of an engine of a machine is disclosed. The machine includes a traction device and a continuously variable transmission (CVT) operatively connected between the engine and the traction device to transfer power output by the engine to the traction device to propel the machine over a work surface of a work site. The method may include receiving engine output command signals and brake force command signals from an operator of the machine indicating a commanded machine function and a commanded brake force, respectively, input by the operator, and performing a transmission output control routine based on the engine output command signals and the transmission output parameter sensor signals to control a machine output of the machine in response to determining that transmission output parameter sensor signals are a reliable indicator of transmission output conditions. In response to determining that the transmission output parameter sensor signals are not the reliable indicator of the transmission output conditions, the method further includes determining a transmission control target engine speed based on the engine output command signals, determining a transmission ratio for the CVT based on the transmission control target engine speed to cause the engine to operate at the transmission control target engine speed, and transmitting transmission command signals to the CVT to control the CVT so that a transmission output speed divided by a transmission input speed is equal to the transmission ratio determined based on the transmission control target engine speed.

DETAILED DESCRIPTION

Figure 1:
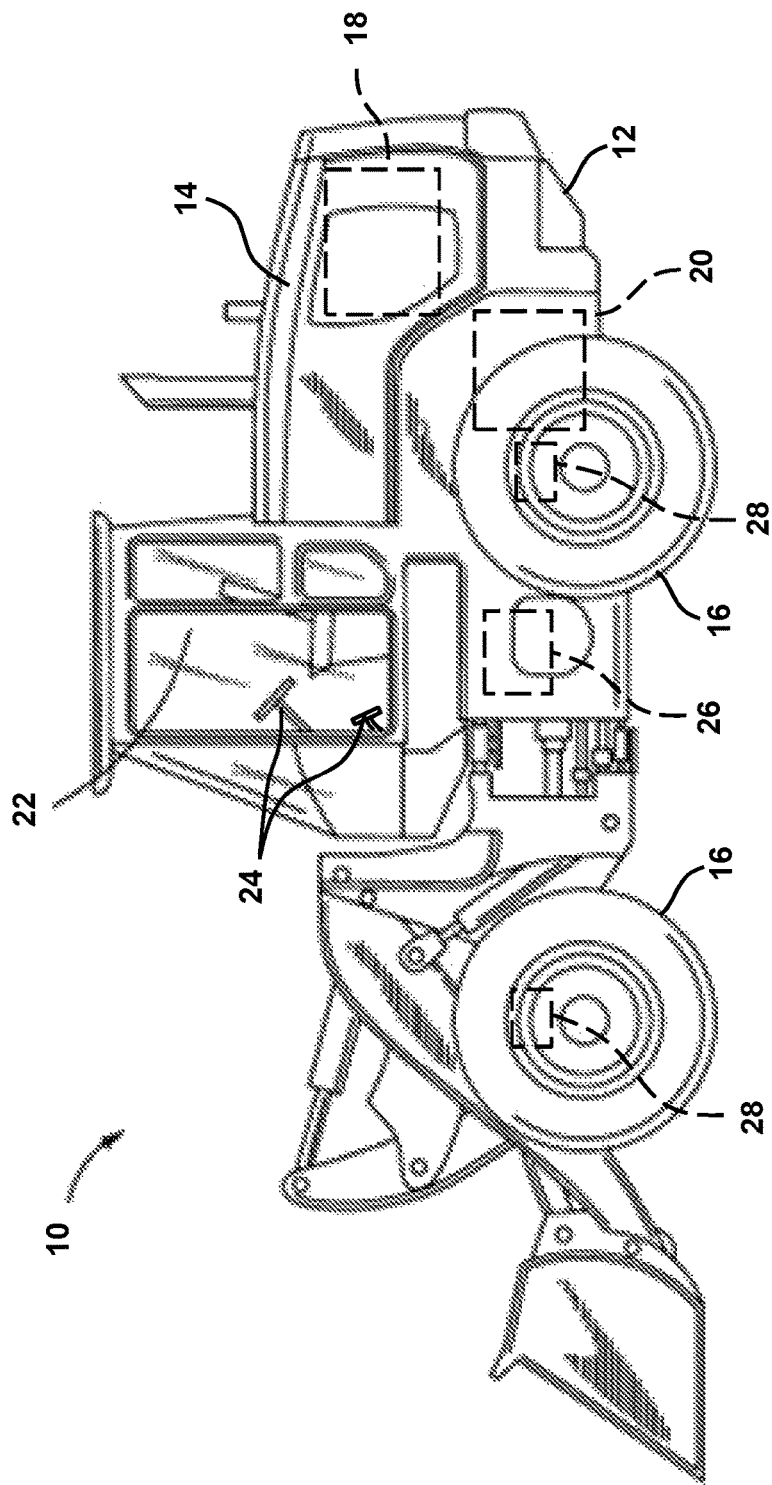
FIG. 1 is a side view of an exemplary vehicle or machine that can travel over a work surface.

FIG. 1 shows an exemplary vehicle or machine 10 in the form of a large wheel loader that may traverse a work surface at a work site. While a wheel loader is shown, the CVT target engine speed control strategy discussed herein may be implemented in any other appropriate type of work vehicle or machine. The machine 10 includes a frame 12 supporting a machine body 14, and with the frame 12 being supported above the work surface by traction devices 16. As illustrated, the traction devices 16 include a plurality of wheels 16, but the traction devices 16 could be any other appropriate devices such as an undercarriage with tracks, halftracks, or combinations of tracks, wheels or other traction devices.

The machine 10 is driven by a power train including an engine 18 operatively connected to a CVT 20 that in turn is operatively connected to the wheels 16. The CVT 20 transfers power generated by the engine 18 to the wheels 16 to rotate the wheels 16 and propel the machine 10 over the work surface. The CVT 20 may be any automatic transmission that can change seamlessly through a continuous range of effective gear ratios. For example, the CVT 20 may be a hydrostatic CVT having a variable displacement pump pumping hydraulic fluid to either a constant displacement or variable displacement hydraulic motor, with the variable displacement pump having a swash plate that is adjusted to vary the flow through the pump and, correspondingly, the gear ratio of the CVT 20 and the load on the engine 18. Alternatively, the CVT 20 could be a variable diameter pulley CVT, a toroidal CVT, a cone CVT or the like providing continuous adjustment through a range of gear ratios.

An operator can control the movement of the machine 10 along with other operations of the machine 10 at an operator station 22. The controlled operations can include speed control, steering, load dumping, actuation of implements of the machine 10, and the like. The operator station 22 may have a plurality of operator input devices 24 for inputting commands for the engine 18, the CVT 20 and other systems of the machine 10. The operator input devices 24 can include engine throttles, brake pedals, gear shift levers, steering wheels, implement lift and articulation controls, graphical user interfaces, and the like. Sensors associated with each of the operator input devices 24 detect manipulation of the operator input devices 24 by an operator and transmit corresponding input device command signals that are received and processed by an electronic control module (ECM) 26. Particularly relevant to the present disclosure are engine output command signals transmitted from an engine throttle or the like, or a combination of operator input devices 24 that may cause the engine 18 to operate according to conventional engine control strategies, and CVT output command signals that may be evaluated by the ECM 26 using an appropriate transmission control strategy to determine a CVT transmission operating state that will cause the CVT 20 to operate with the desired output indicated by the operator. When the ECM 26 executes a transmission output control strategy, the ECM 26 may monitor a desired transmission output parameter indicative of the transmission output conditions, such as, for example, a transmission output speed TOS or a transmission output torque TOT, and use the feedback signal for the monitored transmission output parameter to control the CVT 20 to produce the desired machine output indicated by the operator. When the ECM 26 executes an engine speed control strategy, the ECM 26 may determine a target engine speed TES and corresponding CVT transmission ratio TR that will cause the CVT 20 to apply a load to the engine 18 based on a current transmission output speed TOS that will cause the engine 18 to run at the target engine speed TES as the machine 10 accelerates, decelerates or maintains speed as commanded by the operator. The conditions under which the ECM 26 executes either the transmission output control strategy or the target engine speed control strategy, and exemplary routine for executing the target engine speed control strategy, are discussed further below.

The machine 10 also collects and records operational data relating to the operation of the machine 10 as it operates within the work site and traverses the work surface. The machine 10 may include a variety of sensors 28 operating independently or as components of other control and monitoring systems to automatically monitor various operational data during travel of the machine 10 over the work surface and the performance of machine operations within the work site. The sensors 28 monitoring the operational data may include speed sensors detecting machine, engine and transmission speeds, and torque sensors sensing torque at various points along the power train and/or rolling resistance of the wheels 16. The sensors 28 may also include payload weight sensors detecting the weight of a load carried by the machine 10, pressure sensors for suspension cylinder and lift cylinder pressures, and the like. The operational data monitored by the sensors 28 may also include road parameters such as, for example, the grade of the road over which the machine 10 is traveling measured by inertial measuring units (IMUs), accelerometers or inclinometers, and the location coordinates and elevation of the machine 10 at a given time as detected by global positioning system (GPS) receivers. Some operational data may be monitored directly, while other data may be derived or calculated from the monitored parameters.

Figure 2:
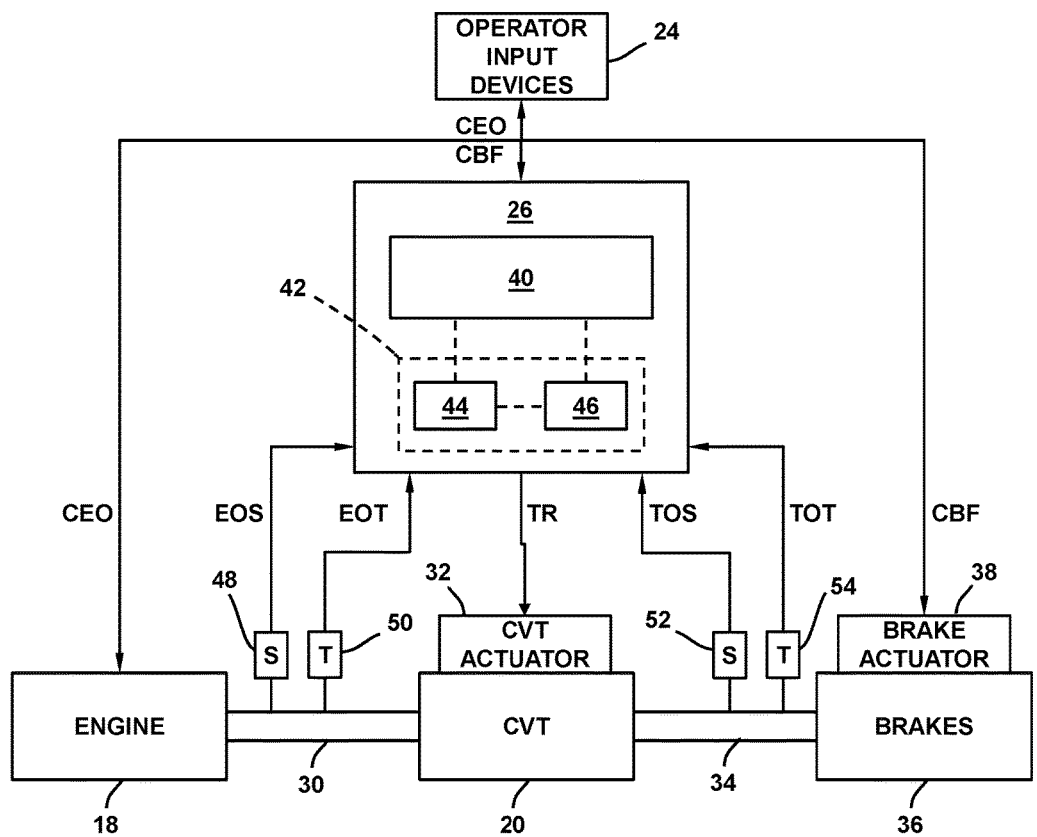
FIG. 2 is a schematic view of mechanical, electrical and control components of a power train of the vehicle of FIG. 1.

The operator input devices 24, the ECM 26 and the sensors 28 are components of a machine control system for the machine 10. Referring to FIG. 2, an exemplary arrangement of mechanical, electrical and control components of the power train of the machine 10 is shown with the various control components integrated into the power train control system. The engine 18 may be configured to receive the engine output commands from the operator input devices 24 and operate with the commanded engine output CEO in response. The engine 18 may be conventional and may include a mechanical governor, an electronic governor implemented in software, or other appropriate conventional engine output control mechanism and control strategy. The engine 18 further includes an engine output shaft 30 operatively connected at an input end of the CVT 20. The engine output shaft 30 may be directly connected to the CVT 20, or connected through an intermediate power transfer device such as a clutch, and torque converter or the like.

The CVT 20 may include a CVT actuator 32 that operates to set or control the CVT 20 to achieve a desired ratio of a transmission output speed TOS to a transmission input speed TIS or to create a desired transmission output torque TOT on the transmission output shaft 34 or a desired load on the engine 18 through the engine output shaft 30 depending on the CVT transmission control strategy being executed by the ECM 26. The configuration of the CVT actuator 32 may vary based on the particular type of CVT 20 implemented in the machine 10. For a hydrostatic CVT, the CVT actuator 32 may operate to rotate the swash plate of the variable displacement pump and/or a variable displacement motor. The hydrostatic CVT actuator 32 may be actuated by the ECM 26 by varying current transmitted to flow control valves of the CVT actuator 32 to move a piston or other component operatively coupled to the swash plate to rotate the swash plate. Variable pulley actuators may control the spacing of sheaves of pulleys in a variable diameter pulley CVT to vary the gear ratio. The ECM 26 may similarly vary current or other appropriate control signals to actuate the CVT actuator 32 and vary the spacing of the sheaves. In alternative embodiments, the CVT actuator 32 may include a CVT actuator controller, and the ECM 26 may transmit appropriate control signals that are interpreted by the CVT actuator controller that in turn will cause the CVT actuator 32 to actuate and adjust the CVT 20. At the output end of the CVT 20, a transmission output shaft 34 may extend and be operatively connected to the wheels 16. Similar to the engine output shaft 30, the transmission output shaft 34 may have intermediate components such as clutches, differentials and the like for transferring the power output from the CVT 20 to the wheels 16.

The machine 10 further includes brakes 36 operably connected to the transmission output shaft 34 for selectively applying brake force to control the speed and momentum of the machine 10. The brakes 36 may include a brake actuator 38 that is actuatable to adjust the brake force applied by the brakes 36. The brakes 36 and the brake actuator 38 may be conventional and may include a mechanical connection to the corresponding operator input device(s) 24, an electrical connection to control valves of the brake actuator 38, or other appropriate conventional actuation and control strategy for converting the operator input of a desired brake force into the application of brake force to the transmission output shaft 34. In alternative embodiments, the brake actuator 38 may include a brake actuator controller, and the ECM 26 may transmit appropriate control signals with the commanded brake force CBF that are interpreted by the brake actuator controller that in turn will cause the brake actuator 38 to actuate and adjust the brakes 36.

The ECM 26 may be capable of processing the information received from the operator input devices 24 and the sensors 28 using software stored at the ECM 26, and outputting command and control signals to the engine 18 and the CVT actuator 32, and information to displays (not shown) in the operator station 22. The ECM 26 may include a processor 40 for executing a specified program, which controls and monitors various functions associated with the machine 10. The processor 40 may be operatively connected to a memory 42 that may have a read only memory (ROM) 44 for storing programs, and a random access memory (RAM) 46 serving as a working memory area for use in executing a program stored in the ROM 44. Although the processor 40 is shown, it is also possible and contemplated to use other electronic components such as a microcontroller, an application specific integrated circuit (ASIC) chip, or any other integrated circuit device. While the discussion provided herein relates to the functionality of a power train control system, the ECM 26 may be configured to control other aspects of the operation of the machine 10 such as, for example, steering, dumping loads of material, actuating implements and the like. Moreover, the ECM 26 may refer collectively to multiple control and processing devices across which the functionality of the power train control system and other systems of the machine 10 may be distributed. For example, the operator station 22, the engine 18, the CVT actuator 32 and/or the brake actuator 38 may each have ECMs that communicate with the main ECM 26. Such variations in consolidating and distributing the processing of the ECM 26 as described herein are contemplated as having use in engine speed control in accordance with the present disclosure.

The operator input devices 24 are operatively connected to the ECM 26 for two-way communications. The operator input devices 24 transmit requests from the operator generated in response to the operator manipulating the controls in the operation station 22, and in particular engine commands indicating an engine speed or engine power output requested by the operator and brake force commands indicating the desired brake force to be applied by the brakes 36. The ECM 26 transmits information to be provided to the operator at output devices (not shown) in the operator station 22. The output devices may be any devices capable of providing a sensory perceptible output to the operator, such as visual display devices, lamps, speakers, and the like. The information communicated to the operator may include an engine speed, a machine speed, a bucket position, a load weight, a fuel level, an operational mode indication, and the like.

The sensors 28 may encompass a variety of sensors that are configured to collect operational data for the machine 10 and transmit sensor signals to the ECM 26 that correspond to the measured values of the operational data. In particular, the sensors 28 discussed herein may collect operational data that is useful in controlling the speed of the engine 18 as the machine 10 travels through the work site. For example, the sensors 28 may include an engine speed sensor 48 and an engine torque sensor 50 operatively coupled to the engine output shaft 30. The engine speed sensor 48 detects the rotational speed of the engine output shaft 30, which corresponds to an engine output speed EOS of the engine 18. The engine torque sensor 50 detects a magnitude of an engine output torque EOT created by the engine output shaft 30 and transmitted to the CVT 20. Similarly, a transmission speed sensor 52 and a transmission torque sensor 54 are operatively coupled to the transmission output shaft 34. The transmission speed sensor 52 detects a transmission output speed TOS of the transmission output shaft 34, and the transmission torque sensor 54 detects a magnitude of a transmission output torque TOT created by the transmission output shaft 34 and transmitted to the wheels 16. The engine speed sensor 48 and the transmission speed sensor 52 transmit engine speed sensor signals and transmission speed sensor signals, respectively, to the ECM 26 having values corresponding to the engine output speed EOS and the transmission output speed TOS, while the engine torque sensor 50 and the transmission torque sensor 54 transmit engine torque sensor signals and transmission torque sensor signals, respectively, to the ECM 26 having values corresponding to the engine output torque EOT and the transmission output torque TOT.

Figure 3:
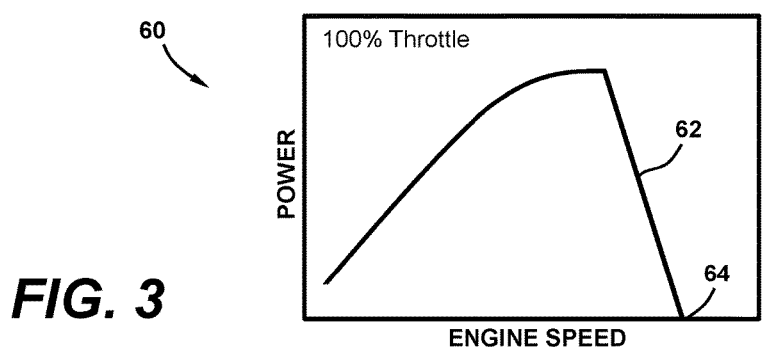
FIG. 3 is a graph of power versus engine speed with an exemplary lug curve for an engine of the vehicle of FIG. 1.

The performance of the engine 18 may be illustrated graphically in FIG. 3. A graph 60 of the power versus the engine speed of the engine 18 has a lug curve 62 representing the operation of the engine 18 at a constant throttle amount. For example, the lug curve 62 may represent the 100% throttle engine response. The engine 18 will have a maximum or high idle engine speed at a point 64 where no load is applied to the engine output shaft 30. As a load on the engine output shaft 30 is increased, the steady state operating point of the engine 18 will move upward and to the left on the lug curve 62 decreasing the engine output speed from its current operating point. As the load on the engine output shaft 30 is decreased, the steady state operating point of the engine 18 will move downward and to the right on the lug curve 62 increasing the engine output speed from its current operating point.

The ECM 26 is operatively connected to the CVT actuator 32 to control the load applied by the CVT 20 on the engine 18, and correspondingly the engine output speed EOS, in response to the engine output command signals from the operator input devices 24. The operator will indicate a desire to increase, decrease or maintain a power output or output speed of the engine 18 by manipulating the appropriate operator input device(s) 24 in the operator station 22. Appropriate sensors associated with the operator input device(s) 24 sense the manipulation of the operator input device(s) 24 and transmit the engine output command signals with values corresponding to the manipulation of the operator input device(s) 24. Simultaneously, the ECM 26 receives the transmission output command signals and determines the appropriate transmission operating state based on the output command signals.

In the machine 10 in accordance with the present disclosure under normal operating conditions, the ECM 26 may execute the transmission output control strategy discussed above wherein the ECM 26 monitors the desired transmission output parameter for the transmission output conditions and uses the feedback signal for the monitored transmission output parameter to control the CVT 20 to produce the desire machine output indicated by the operator through the engine output command signals. Strategies for performing transmission output control are known to those skilled in the art, and the implementation of such known transmission output control strategies and later developed strategies in machines 10 in accordance with the present disclosure are contemplated by the inventor. Normal operating conditions for executing the transmission output control strategy exist when the brakes 36 are not being applied to create brake force on the transmission output shaft 34 and the transmission torque sensor 54 is functioning properly. Under these conditions, the transmission output parameter(s) monitored by the appropriate sensor(s) 28 and transmitted to the ECM 26 as feedback signals are an accurate indicator of the transmission output conditions at the CVT 20.

The transmission output control strategy works well during typical operation of the machine 10, but may have limitations under conditions where the transmission output feedback signals for the transmission output parameter(s) are unreliable indicators of the actual conditions at the transmission output. For example, when the operator lets off the engine throttle and applies the brakes 36 to slow the machine 10, the ECM 26 may set target transmission output to zero or to a low idle output torque, while the brake force applied by the brakes 36 to the transmission output shaft 34 influences the measurement of the transmission output torque TOT measured by the transmission torque sensor 54 and used as the feedback signal by the ECM 26. The transmission output control strategy tries to adjust for incorrectly measured transmission output torque TOT that is being influenced by the application of the brakes 36. The situation can lead to instability as the ECM 26 adjusts the CVT 20 to correct the falsely measured transmission output torque TOT while the brakes 36 are applying torque to the transmission output shaft 34. As a further example, the transmission output feedback signals will be unreliable when the transmission torque sensor 54 is faulty or malfunctioning and is either not transmitting signals to the ECM 26 or transmitting signals that do not represent the actual transmission output torque TOT.

To handle these and other situations where the transmission output feedback is unreliable, the ECM 26 in accordance with the present disclosure may be configured to execute a target engine speed control strategy in place of the transmission output control strategy and controlling the CVT 20 using the engine output speed EOS as feedback to maintain an approximately constant target engine speed TES. Under the target engine speed control strategy, the ECM 26 may use the engine output commands along with other operator inputs and/or operational data from the sensors 28 to determine the target engine speed TES and the corresponding transmission ratio TR. The transmission control software determines the transmission ratio TR for the CVT 20 needed to apply a load on the engine 18 so that the engine 18 will run at the target engine speed TES. The target engine speed TES may be determined in any appropriate manner based on the engine operating requirements for a particular implementation. In one embodiment, the target engine speed TES may be a predetermined engine speed stored at the ECM 26. The target engine speed may be fixed for the machine 10, or may be updatable via any appropriate mechanism such as operator input at one of the operator input devices 24. In alternative embodiments, the value of the target engine speed TES may be mapped to one or more operator inputs. For example, the target engine speed TES may be determined based on the engine throttle commands from the operator. The target engine speed TES may be proportional to the value of the engine throttle command so that the target engine speed TES has a maximum value at the 100% throttle position and decreases as the displacement of the engine throttle decreases. The value of the target engine speed TES may be similarly affected by additional or alternative operator inputs as necessary.

Also under the target engine speed control strategy, the transmission ratio TR may be determined using the target engine speed TES determined by the ECM 26 along with a current machine speed CMS of the machine 10. In the target engine speed control strategy in accordance with the present disclosure, the transmission ratio TR may be manipulated to create a load on the engine 18 at the current machine speed CMS that will force the engine 18 to operate at the target engine speed TES. The transmission ratio is equal to the transmission output speed TOS divided by the transmission input speed TIS in the target engine speed control strategy. In calculating the transmission ratio TR, the transmission input speed TIS may have a value corresponding to the commanded target engine speed TES. The transmission output speed TOS may be the sensor value transmitted by the transmission speed sensor 52, or any other appropriate value reflecting the current machine speed CMS.

After determining the target engine speed TES and the transmission ratio TR, the ECM 26 will cause the CVT actuator 32 to actuate by varying a control current, transmitting control signals or otherwise communicating with the CVT actuator 32. The CVT actuator 32 in response actuates to cause the CVT 20 to have the CVT transmission ratio TR to force the engine output speed EOS to the target engine speed TES. This process may be repeated over time to maintain the engine output speed EOS approximately equal to the target engine speed TES.

Figure 4:
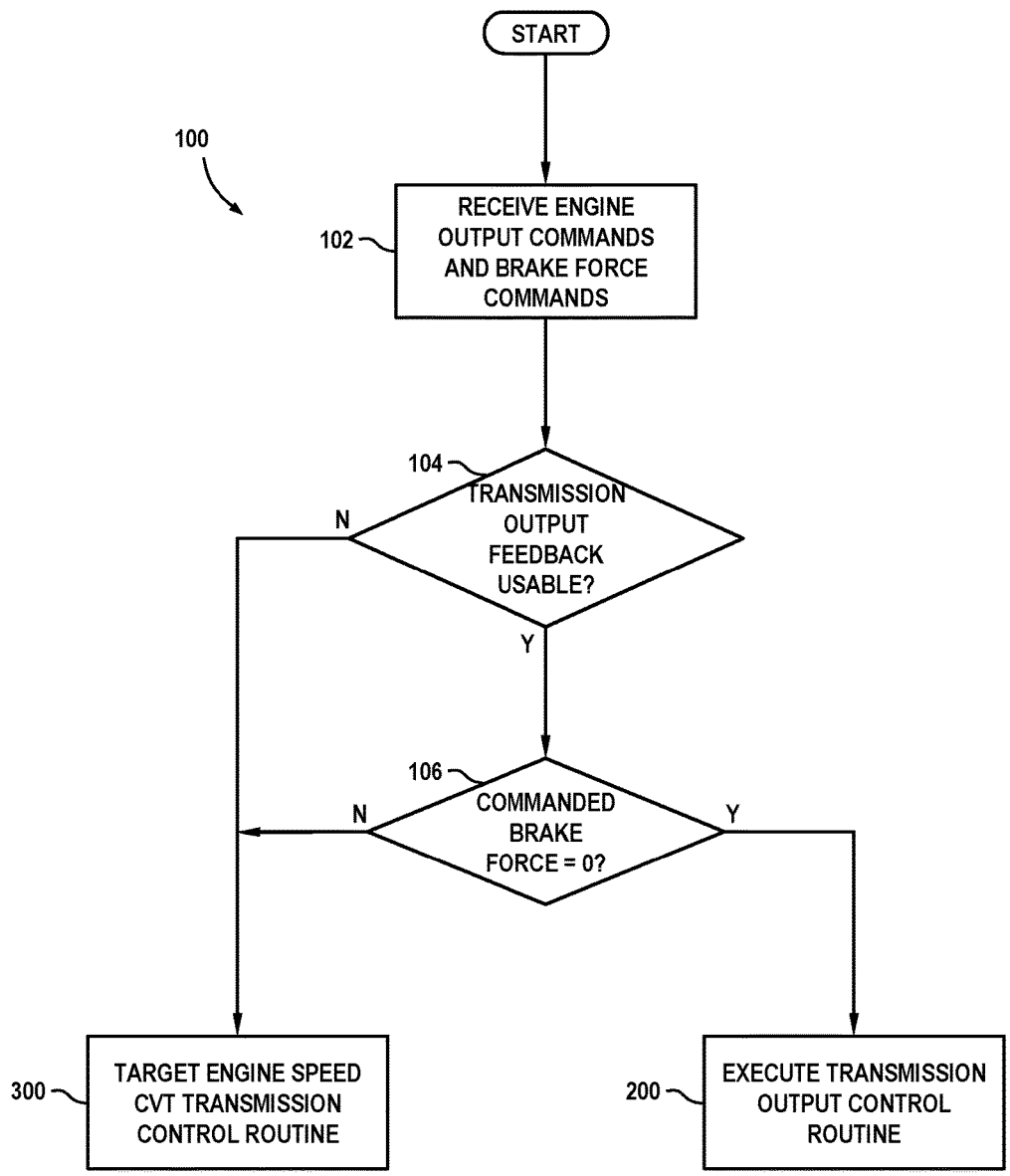
FIG. 4 is a block diagram of a CVT transmission control strategy selection routine in accordance with the present disclosure that may be executed by an electronic control module of the vehicle of FIG. 1.

FIG. 4 illustrates an exemplary CVT transmission control strategy selection routine 100 that may be stored in the memory 42 and executed by the ECM 26. The routine 100 is configured to determine whether conditions exist that make the transmission output feedback signals unreliable for use in the transmission output control strategy. If the feedback signals are unreliable, the routine 100 will cause the ECM 26 to execute the target engine speed control strategy. The routine 100 evaluates the application of the brakes 36 and the operational status of the transmission torque sensor 54, but those skilled in the art will understand that other factors may exist that may render the transmission output feedback signals unreliable, and evaluation of such factors by the ECM 26 in the routine 100 is contemplated as having use in machines 10 in accordance with the present disclosure.

The routine 100 starts at a block 102 where the ECM 26 receives the engine output commands and brake force commands transmitted from the operator input devices 24 and determines the values of the engine output commands and the brake force commands input by the operator to cause the machine 10 to move over the work surface at varying speeds and with varying power outputs. In some embodiments, the operator input devices 24 may transmit engine output commands having values equal to zero if the operator has not operated any of the operator input devices 24. In these or other embodiments, if no engine output commands are detected, the ECM 26 may interpret the absence of engine output commands as a commanded engine output CEO of zero. When the engine output commands have values of or are determined to be equal to zero, the ECM 26 may maintain the engine 18 at a low idle speed if the machine 10 is not moving, or handle coasting or braking of the machine 10 if the machine 10 is moving over the work surface in the succeeding steps of the routine 100. It should be noted that the engine output commands are concurrently received by the engine 18 and the appropriate conventional engine output control mechanism and control strategy will cause the engine 18 to operate at a corresponding engine speed or engine power.

The brake pedal or other brake input device (not shown) at the operator station 22 may have an associated brake input sensor (not shown) for detecting movement of the brake input device and transmitting brake force command signals. The brake force command signals have values representing the commanded brake force CBF that corresponds to the amount of displacement of the brake input device. If the commanded brake force CBF in the brake force command signals is greater than zero, the operator is requesting brake force to apply torque to the transmission output shaft 34 and reduce the momentum of the machine 10. It should be noted that the brake force commands are concurrently received by the brake actuator 38 in the present embodiment and the appropriate conventional brake control mechanism and brake control strategy will cause the brakes 36 to apply the corresponding brake force to the transmission output shaft 34.

After the commanded engine output CEO and the command brake force CBF are determined by the ECM 26 at the block 102, control may pass to a block 104 where the ECM 26 determines whether the transmission output feedback signal is usable. Various conditions of the transmission torque sensor 54 may render the transmission output torque TOT signal unusable or unreliable, and the ECM 26 may be programmed to assess some or all of the conditions. For example, the ECM 26 may assess whether signals from the transmission torque sensor 54 are being received or have been cutoff. Such assessment may include determining whether a predetermined time period has elapsed since last receiving signals from the transmission torque sensor 54 that may indicate that the transmission torque sensor 54 is not transmitting signals or that the connection between the ECM 26 and the transmission torque sensor 54 has been severed. In other implementations, the ECM 26 may be programmed to transmit a status request message to the transmission torque sensor 54 to which the transmission torque sensor 54 will respond if the transmission torque sensor 54 is functioning properly. In still other implementations, the ECM 26 or the transmission torque sensor 54 may periodically perform diagnostics on the transmission torque sensor 54 to determine the operational status. Data from the diagnostics, including an operational status of the transmission torque sensor 54, may be stored at the ECM 26 and evaluated by the ECM 26 at the time the routine 100 is executed. If the ECM 26 determines that the signal from the transmission torque sensor 54 is not usable at the block 104 using any individual assessment or combination of assessment tools, control may pass to a target engine speed CVT transmission control routine 300 where the target engine speed control strategy will be executed to control the CVT 20 as discussed further below.

If the ECM 26 determines that the signal from the transmission torque sensor 54 is usable at the block 104, control may pass to a block 106 where the ECM 26 determines whether the brakes 36 are being applied. The ECM 26 may determine whether the commanded brake force CBF from the block 102 is greater than zero. If the commanded brake force CBF is greater than zero, application of the brakes 36 is being requested by the operator, and the transmission output feedback signal may be unreliable for the reasons discussed above. Consequently, if the commanded brake force CBF is greater than zero, control may pass to the target engine speed CVT transmission control routine 300 for execution of the target engine speed control strategy. If the commanded brake force CBF is not greater than zero, the brakes 36 are not being applied, and control may pass to a transmission output control routine 200 for execution of the transmission output control strategy of the type discussed above.

Figure 5:
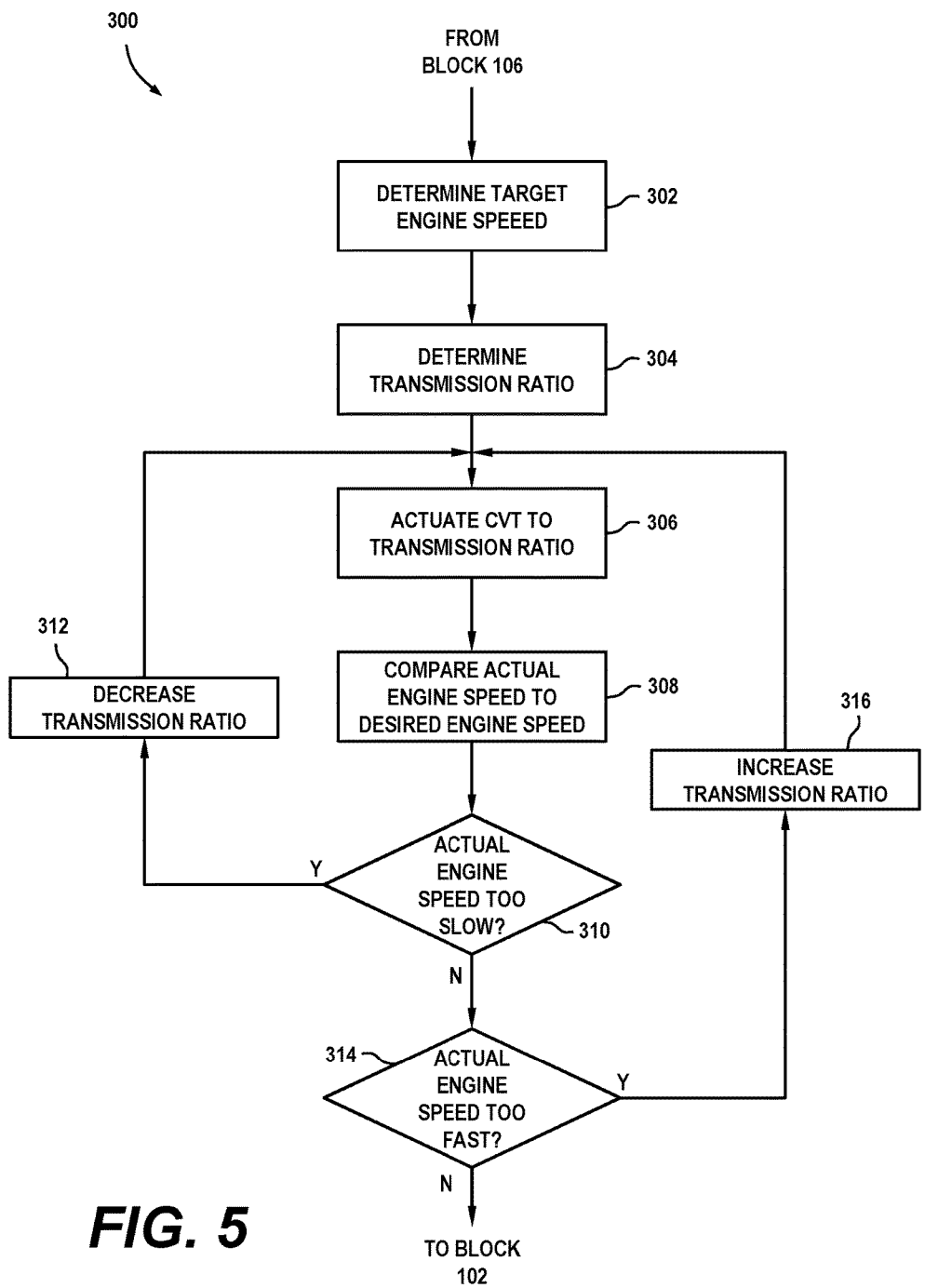
FIG. 5 is a block diagram of a target engine speed CVT transmission control routine in accordance with the present disclosure that may be executed by an electronic control module of the vehicle of FIG. 1.

FIG. 5 illustrates a flow diagram for a target engine speed CVT transmission control routine 300 that may be stored in the memory 42 and executed by the ECM 26 after the ECM 26 determines in the routine 100 that the transmission output feedback signal is unreliable due to application of the brakes 36, failure or malfunctioning of the transmission torque sensor 54 or other conditions. The routine 300 is configured so the ECM 26 can control the CVT 20 to maintain the engine output speed EOS approximately equal to the target engine speed TES over time using the engine output speed signals from the engine speed sensor 48 as feedback. In alternative implementations, the transmission output speed signals from the transmission speed sensor 52 are also used in the control strategy. The control strategy works to drive the engine 18 to the target engine speed TES by manipulating the transmission ratio TR of the CVT 20.

The routine 300 starts after the ECM 26 receives the engine output commands at the block 102 of the routine 100 and determines that the transmission output feedback signals are unreliable. After the processing of the routine 100, control may pass to a block 302 where the ECM 26 may determine a transmission control target engine speed TES corresponding to the values in the engine output commands.

The ECM 26 may determine the target engine speed TES using any appropriate method such as those described above. Subsequent to the determination of the target engine speed TES, control may pass to a block 304 where the ECM 26 may calculate the transmission ratio TR for the CVT 20 that will apply a load to the engine 18 to force the engine 18 to run at approximately the target engine speed TES determined at the block 302. The ECM 26 may determine the transmission ratio TR using any appropriate method such as those described above.

After determining the target engine speed TES and the transmission ratio TR at the blocks 302, 304, respectively, control passes to a block 306 where the ECM 26 transmits transmission command signals to the CVT actuator 32. Upon receiving the transmission command signals, the CVT actuator 32 adjusts the CVT 20 to provide the calculated transmission ratio TR between the transmission output shaft 34 and the engine output shaft 30. With the CVT 20 creating the transmission ratio TR between the shafts 30, 34, the CVT 20 creates the load on the engine 18 to force the engine 18 to the target engine speed TES. The transmission command signals may be the appropriate type of input signals for the particular CVT actuator 32 implemented in the machine 10, such as varying currents, digital control signals or other appropriate control signals such as those described above.

With the CVT actuator 32 controlling the CVT 20 per the transmission command signals from the ECM 26 to force the engine 18 toward the target engine speed TES, control may pass to a block 308 where the ECM 26 compares the desired engine speed (i.e., target engine speed TES) to the actual engine speed (i.e., engine output speed EOS). By utilizing the engine output speed EOS as the feedback signal, the engine 18 may be maintained at approximately the target engine speed TES to reduce wear on the engine 18 that can be caused by highly fluctuating engine speeds. After the comparison, control may pass to a block 310 where the ECM 26 evaluates whether the engine output speed EOS is too low. In some implementations, any variation in the engine output speed EOS from the target engine speed TES may cause corrective action to be taken to bring the engine output speed EOS back to the target engine speed TES. In other implementations, the difference may be required to be greater than a predetermined minimum engine speed error for corrective action to occur. For example, the difference between the engine output speed EOS and the target engine speed TES may be required to be greater than a specified number of revolutions per minute or a specified percentage of the target engine speed TES for corrective action to occur.

If the ECM 26 determines at the block 310 that the engine output speed EOS is less than the target engine speed TES by more than a minimum engine speed difference, control may pass to a block 312 where the ECM 26 may calculate a revised transmission ratio TR that will increase the engine output speed EOS. As shown in the graph 60 of FIG. 3, the engine speed increases as the load on the engine output shaft 30 decreases. Consequently, the ECM 26 will determine a reduced transmission ratio TR that will reduce the load on the engine output shaft 30 and allow the engine output speed EOS to increase for the same throttle setting of the engine 18. For a hydrostatic CVT, the reduced transmission ratio TR may equate to rotating the swash plate of the variable displacement pump toward a zero flow or neutral position so that the fluid displacement per revolution of the pump input shaft is reduced. For a variable diameter pulley CVT, an input pulley diameter may be decreased and an output pulley diameter correspondingly increased to increase the number of rotations of the input pulley per rotation of the output pulley. Similar adjustments will be determined by the ECM 26 for other types of CVTs 20. After the ECM 26 determines the reduced transmission ratio TR at the block 114, control may pass back to the block 108 to output updated transmission command signals to the CVT actuator 32 to adjust the transmission ratio TR of the CVT 20.

If the engine output speed EOS is not too slow at the block 310, control passes to a block 314 where the ECM 26 determines whether the engine output speed EOS is too fast. As discussed above, in various implementations, corrective action may be taken any time the engine output speed EOS is greater than the target engine speed TES to reduce the engine output speed EOS, or corrective action may be taken if the engine output speed EOS is greater than the target engine speed TES by a predetermined number of revolutions per minute or percentage above the target engine speed TES. If the ECM 26 determines that the engine output speed EOS is greater than the target engine speed TES by more than a minimum engine speed difference, control may pass to a block 316 where the ECM 26 calculates a revised transmission ratio TR that will reduce the engine output speed EOS. Per the graph 60 of FIG. 3, increasing the load on the engine output shaft 30 will reduce the engine output speed EOS. The load on the engine 18 can be increased by increasing the transmission ratio TR. In a hydrostatic CVT, the swash plate to the variable displacement pump can be rotated to increase the fluid flow through the pump. For a variable diameter pulley CVT, the input pulley diameter can be increased and the output pulley diameter can be correspondingly decreased to decrease the number of rotations of the input pulley per rotation of the output pulley. Other CVTs 20 can be adjusted as necessary to increase the transmission ratio TR. After the ECM 26 determines the increased transmission ratio TR to slow down the engine 18 to the target engine speed TES, control may pass back to the block 306 to transmit the updated transmission command signals to the CVT actuator 32.

If the ECM 26 determines that the engine output speed EOS is equal to the target engine speed TES, or differs within an acceptable range from the target engine speed TES, at the blocks 310, 314, control may pass back to the block 102 of the routine 100 to continue receiving and evaluating the engine output commands and the brake force commands from the operator input devices 24.

In the preceding discussion of the routine 300, the engine output speed EOS is impliedly the control error for the target engine speed control routine 300. Consequently, the engine output speed EOS is directly compared to the target engine speed TES to determine whether the transmission ratio TR must be updated to get the engine output speed EOS within an acceptable range about the target engine speed TES. In alternative implementations, the transmission ratio TR can be used as the control error since the transmission ratio TR is being adjusted to correct errors in the engine output speed EOS. In such implementations, the routine 300 may be adjusted to evaluate an actual transmission ratio ATR of the CVT 20 relative to a desired transmission ratio DTR to determine whether to adjust the transmission ratio TR. In the modified routine 300, the desired transmission ratio DTR may be equal to the transmission output speed TOS measured by the transmission speed sensor 52 divided by the target engine speed TES determined by the ECM 26. The actual transmission ratio ATR is equal to the transmission output speed TOS divided by the engine output speed measured by the engine speed sensor 48.

In this implementation, the routine 300 begins at the blocks 302, 304, 306 as described above. At the block 308, the ECM 26 calculates and compares the desired transmission ratio DTR to the actual transmission ratio ATR instead of directly comparing the engine output speed EOS to the target engine speed TES. Control then passes to the block 310 to determine whether the actual transmission ratio ATR is greater than the desired transmission ratio DTR (i.e., the engine output speed EOS is less than the target engine speed TES, and therefore too slow). If the actual transmission ratio ATR is too high, the engine output speed EOS must be increased to reduce the actual transmission ratio ATR. Consequently, if the actual transmission ratio ATR is greater than the desired transmission ratio DTR by a predetermined minimum transmission ratio error, control passes to the block 312 for the ECM 26 to determine a reduced transmission ratio TR that will increase the engine output speed EOS and thereby reduce the actual transmission ratio ATR.

If the actual transmission ratio ATR is not greater than the desired transmission ratio DTR at the block 310, control passes to the block 314 to determine whether the actual transmission ratio ATR is less than the desired transmission ratio DTR (i.e., the engine output speed is greater than the target engine speed TES, and therefore too fast). If the actual transmission ratio ATR is too low, the engine output speed EOS must be decreased to increase the actual transmission ratio ATR. If the actual transmission ratio ATR is too low by more than the predetermined minimum transmission ratio error, control passes to the block 316 for the ECM 26 to determine an increased transmission ratio TR that will decrease the engine output speed EOS and increase the actual transmission ratio ATR.

INDUSTRIAL APPLICABILITY

The apparatus and method of the present disclosure allows for the performance of CVT transmission control in the machine 10 using reliable feedback information so that instability is not created while driving the machine 10 over a work surface. Under normal operating conditions, the transmission output control strategy may be executed to propel the machine 10 across the work surface according to a desired transmission output torque input by the operator of the machine 10. When conditions indicate that transmission output feedback signals used in the transmission output control strategy are unreliable, such as when the brakes 36 are applied or when the transmission torque sensor 54 fails or malfunctions, the ECM 26 may adjust to executing the target engine speed CVT transmission control strategy that uses the engine output speed signal as feedback to control power output and the machine speed of the machine 10 until the conditions causing the unreliability of the transmission output feedback signals are corrected or otherwise eliminated.

The method for target engine speed control in accordance with the present disclosure utilizes the speed of the engine 18, either directly or indirectly via the actual transmission ratio TR, to maintain the engine output speed EOS approximately equal to the target engine speed TES determined based on engine output commands from an operator. Previous control strategies utilize the transmission output speed TOS or the transmission output torque to control cause the machine 10 to respond to the operator's desired machine output. Such control strategies provide good resolution on the output torque or the machine speed in comparison to the operator commands. However, the engine speed fluctuates to accommodate changing driveline efficiencies in the power train. In some situations, high fluctuations in engine speeds can cause greater wear in the engine 18 over time. In some implementations, maintaining the engine 18 at as constant an engine speed as possible for durability and to prolong the life of the engine 18 may be a higher priority machine requirement than precise control of the speed or torque at the output of the CVT 20. The control strategy in accordance with the present disclosure provides good resolution on the engine speed while allowing the transmission output speed TOS and the output torque to fluctuate to accommodate the changing driveline efficiencies in the power train.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A machine for operating at a work site and traveling over a work surface of the work site, the machine comprising:
   an engine;
   a traction device;
   a continuously variable transmission (CVT) operatively connected between the engine and the traction device to transfer power output by the engine to the traction device;
   operator input devices in an operator station of the machine for detecting engine output commands and brake force commands that are input by an operator of the machine and outputting engine output command signals corresponding to the engine output commands and brake force command signals corresponding to the brake force commands input by the operator at the operator input devices;
   a transmission output parameter sensor automatically monitoring a transmission output parameter of the CVT and outputting transmission output parameter sensor signals corresponding to the transmission output parameter of the CVT;
   an engine speed sensor automatically monitoring an engine output speed of the engine and outputting engine speed sensor signals corresponding to the engine output speed of the engine; and
   an electronic control module (ECM) operatively connected to the engine, the CVT, the operator input devices, the engine speed sensor and the transmission output parameter sensor, wherein the ECM is programmed to:

receive the engine output command signals and the brake force command signals from the operator input devices, in response to determining that the transmission output parameter sensor signals from the transmission output parameter sensor are a reliable indicator of transmission output conditions, execute a transmission output control routine based on the engine output command signals and the transmission output parameter sensor signals to control a machine output of the machine, and in response to determining that the transmission output parameter sensor signals from the transmission output parameter sensor are not the reliable indicator of the transmission output conditions:

determine a transmission control target engine speed based on the engine output command signals, determine a transmission ratio for the CVT based on the transmission control target engine speed to cause the engine to operate at the transmission control target engine speed, and transmit transmission command signals to the CVT to control the CVT so that a transmission output speed divided by a transmission input speed is equal to the transmission ratio determined based on the transmission control target engine speed.

2. The machine of claim 1, wherein the ECM determines that the transmission output parameter sensor signals are not the reliable indicator of the transmission output conditions by determining that the transmission output parameter sensor is malfunctioning.

3. The machine of claim 1, wherein the ECM determines that the transmission output parameter sensor signals are not the reliable indicator of the transmission output conditions by determining that a commanded brake force in the brake force command signals is greater than zero.

4. The machine of claim 1, wherein the ECM determines that the transmission output parameter sensor signals are the reliable indicator of the transmission output conditions by determining that the transmission output parameter sensor is functioning properly and a commanded brake force in the brake force command signals is equal to zero.

5. The machine of claim 1, wherein the ECM is programmed to, in response to determining that the transmission output parameter sensor signals from the transmission output parameter sensor are not the reliable indicator of the transmission output conditions:

receive the engine speed sensor signals from the engine speed sensor and compare the engine output speed from the engine speed sensor signals to the transmission control target engine speed, and calculate a revised transmission ratio that will cause the engine output speed to be approximately equal to the transmission control target engine speed and transmit revised transmission command signals to the CVT to control the CVT to the revised transmission ratio in response to determining that the engine output speed is not equal to the transmission control target engine speed.

6. The machine of claim 5, wherein the ECM is programmed to calculate the revised transmission ratio to be less than the transmission ratio in response to determining that the engine output speed is less than the transmission control target engine speed.

7. The machine of claim 5, wherein the ECM is programmed to calculate the revised transmission ratio to be greater than the transmission ratio in response to determining that the engine output speed is greater than the transmission control target engine speed.

8. The machine of claim 5, comprising a transmission speed sensor operatively connected to the CVT and the ECM and automatically monitoring the transmission output speed of the CVT and outputting transmission speed sensor signals corresponding to the transmission output speed of the CVT, wherein the ECM is programmed to calculate a desired transmission ratio that is equal to the transmission output speed divided by the transmission control target engine speed, and calculate an actual transmission ratio that is equal to the transmission output speed divided by the engine output speed.

9. The machine of claim 8, wherein the ECM is programmed to:

calculate the revised transmission ratio to be less than the transmission ratio in response to determining that the actual transmission ratio is greater than the desired transmission ratio; and calculate the revised transmission ratio to be greater than the transmission ratio in response to determining that the actual transmission ratio is less than the desired transmission ratio.

10. The machine of claim 8, wherein the ECM is programmed to:

calculate the revised transmission ratio to be less than the transmission ratio in response to determining that the actual transmission ratio is greater than the desired transmission ratio by more than a predetermined minimum transmission ratio error; and calculate the revised transmission ratio to be greater than the transmission ratio in response to determining that the actual transmission ratio is less than the desired transmission ratio by more than the predetermined minimum transmission ratio error.

11. A method for controlling an engine output speed of an engine of a machine, wherein the machine includes a traction device and a continuously variable transmission (CVT) operatively connected between the engine and the traction device to transfer power output by the engine to the traction device to propel the machine over a work surface of a work site, the method comprising:

receiving engine output command signals and brake force command signals from an operator of the machine indicating a commanded machine function and a commanded brake force, respectively, input by the operator;

in response to determining that transmission output parameter sensor signals are a reliable indicator of transmission output conditions, performing a transmission output control routine based on the engine output command signals and the transmission output parameter sensor signals to control a machine output of the machine; and in response to determining that the transmission output parameter sensor signals are not the reliable indicator of the transmission output conditions:

determining a transmission control target engine speed based on the engine output command signals, determining a transmission ratio for the CVT based on the transmission control target engine speed to cause the engine to operate at the transmission control target engine speed, and transmitting transmission command signals to the CVT to control the CVT so that a transmission output speed divided by a transmission input speed is equal to the transmission ratio determined based on the transmission control target engine speed.

12. The method of claim 11, comprising determining that the transmission output parameter sensor signals are not the reliable indicator of the transmission output conditions by determining that a transmission output sensor transmitting the transmission output parameter sensor signals is malfunctioning.

13. The method of claim 11, comprising determining that the transmission output parameter sensor signals are not the reliable indicator of the transmission output conditions by determining that the commanded brake force in the brake force command signals is greater than zero.

14. The method of claim 11, comprising determining that the transmission output parameter sensor signals are the reliable indicator of the transmission output conditions by determining that a transmission output sensor transmitting the transmission output parameter sensor signals is functioning properly and the commanded brake force in the brake force command signals is equal to zero.

15. The method of claim 11, comprising, in response to determining that the transmission output parameter sensor signals are not the reliable indicator of the transmission output conditions:
- comparing the engine output speed of the engine to the transmission control target engine speed; and
- calculating a revised transmission ratio that will cause the engine output speed to be approximately equal to the transmission control target engine speed and transmitting revised transmission command signals to the CVT to control the CVT to the revised transmission ratio in response to determining that the engine output speed is not equal to the transmission control target engine speed.

16. The method of claim 15, comprising calculating the revised transmission ratio to be less than the transmission ratio in response to determining that the engine output speed is less than the transmission control target engine speed.

17. The method of claim 15, comprising calculating the revised transmission ratio to be greater than the transmission ratio in response to determining that the engine output speed is greater than the transmission control target engine speed.

18. The method of claim 15, comprising calculating a desired transmission ratio that is equal to the transmission output speed divided by the transmission control target engine speed, and calculating an actual transmission ratio that is equal to the transmission output speed divided by the engine output speed.

19. The method of claim 18, comprising:
- calculating the revised transmission ratio to be less than the transmission ratio in response to determining that the actual transmission ratio is greater than the desired transmission ratio; and
- calculating the revised transmission ratio to be greater than the transmission ratio in response to determining that the actual transmission ratio is less than the desired transmission ratio.

20. The method of claim 18, comprising:
- calculating the revised transmission ratio to be less than the transmission ratio in response to determining that the actual transmission ratio is greater than the desired transmission ratio by more than a predetermined minimum transmission ratio error; and
- calculating the revised transmission ratio to be greater than the transmission ratio in response to determining that the actual transmission ratio is less than the desired transmission ratio by more than the predetermined minimum transmission ratio error.

* * * * *